United States Patent [19]

Bracke

[11] 4,141,933
[45] Feb. 27, 1979

[54] PROCESS FOR PRODUCING ABS RESINS

[75] Inventor: William J. I. Bracke, Hamme, Belgium

[73] Assignee: Laborfina S.A., Brussels, Belgium

[21] Appl. No.: 865,223

[22] Filed: Dec. 28, 1977

Related U.S. Application Data

[63] Continuation of Ser. No. 705,389, Jul. 15, 1976, abandoned, which is a continuation of Ser. No. 553,608, Feb. 27, 1975, abandoned, and Ser. No. 553,609, Feb. 27, 1975, abandoned.

[30] Foreign Application Priority Data

Oct. 24, 1974 [BE] Belgium ............................ 04/149844

[51] Int. Cl.$^2$ ............................................. C08F 279/04
[52] U.S. Cl. ................................................. 260/880 R
[58] Field of Search ....................................... 260/880 R

[56] References Cited

U.S. PATENT DOCUMENTS

| | | | |
|---|---|---|---|
| 2,754,290 | 7/1956 | Kern | 260/88.7 |
| 3,373,227 | 3/1968 | Finestone | 260/880 R |
| 3,551,523 | 12/1970 | Killoran | 260/880 R |

OTHER PUBLICATIONS

R. J. Kern, J. Am. Chem. Soc. 77, 1382–1383, 1955.

*Primary Examiner*—Paul R. Michl
*Attorney, Agent, or Firm*—Robert J. Koch

[57] ABSTRACT

A process for producing ABS resins by copolymerizing a mixture of a styrenic compound and an unsaturated nitrile selected from the group consisting of acrylonitrile and methacrylonitrile, in the presence of an elastomer, by a two-step process comprising a mass copolymerization step and then a suspension copolymerization step, said process comprising carrying out the mass copolymerization step in the presence of p-chlorobenzoyl peroxide as an initiator and dithiobis(benzothiazole) as a chain transfer agent.

10 Claims, No Drawings

PROCESS FOR PRODUCING ABS RESINS

BACKGROUND OF THE INVENTION

This application is a continuation application of application Ser. No. 705,389, filed July 15, 1976, now abandoned, which is a Continuation application of application Ser. Nos. 553,608 and 553,609 filed Feb. 27, 1975 both now abandoned.

The present invention relates to a process for producing acrylonitrile-butadiene-styrene (ABS) resins. More particularly, the present invention relates to a process for producing ABS resins employing a polymerization initiator in combination with a chain transfer agent.

By polymerizing vinyl compounds, more particularly a mixture of styrene and acrylonitrile, in the presence of an elastomer such as a polybutadiene rubber, compositions are obtained which consist of said rubber and acrylonitrile-styrene copolymers, a part of said copolymers being grafted on the rubber particles. Such resins, which are called ABS resins, have good mechanical properties, particularly a high impact resistance, when the rubber is grafted by at least 5% of its own weight with styrene-acrylonitrile copolymers and the remainder of the copolymers forming a continuous phase wherein the particles of grafted rubber are dispersed. Instead of styrene or in admixture with styrene, another vinylaromatic compound, such as alpha-alkylstyrene or halostyrene may be used, for example alpha-methylstyrene, p-chlorostyrene and the like. Such materials are herein collectively referred to as "styrene". In the same manner, methacrylonitrile may be used instead of or in admixture with acrylonitrile, such materials being herein collectively referred to as "acrylonitrile".

For preparing ABS resins, usual polymerization processes may be used, such as either mass, emulsion or suspension polymerization. In commercial practice, a two-step copolymerization is most often used, such two-step process comprising a mass pre-copolymerization followed by a suspension copolymerization. The resins so obtained are beads which are easily separated from the reaction mixture and may then be washed and dried.

The first step or mass copolymerization is most often carried out in the presence of a free radical generating initiator, particularly a peroxide or azo type initiator, such as benzoyl peroxide, lauroyl peroxide, dicumyl peroxide, butyl peracetate, alpha, alpha-azo-diisobutyronitrile or their mixtures. However, it is difficult to control the reaction temperature during said first step of the process.

An object of the present invention is to provide a new and improved process for producing ABS resins by a two-step process.

Another object of the present invention is to provide a new and improved two-step process for producing ABS resins in which improved control of the temperature is obtained during the first step.

Still another object of the present invention is to provide a new and improved process for producing ABS resins in the presence of a polymerization initiator and a chain transfer agent which are suitable for control of the polymerization temperature and the chain length of the polymerized product without detrimental effect on the polymerization yield of the monomers.

A further object of the present invention is to provide a process for producing ABS resins having a higher gloss.

SUMMARY OF THE INVENTION

The present invention is a process for producing ABS resins by grafting a styrenic compound and an unsaturated nitrile selected from the group comprising acrylonitrile and methacrylonitrile to an elastomer in a two-step polymerization involving a mass polymerization first step and a suspension polymerization second step, said process comprising carrying out the first step polymerization in the presence of p-chlorobenzoyl peroxide as an initiator and dithiobis-(benzothiazole) as a chain transfer agent.

More particularly, the process of the present invention comprises carrying out the mass copolymerization step of a styrenic compound and an unsaturated nitrile, selected from the group consisting of acrylonitrile and methacrylonitrile, in the presence of an elastomer, in the absence of air or oxygen and in the presence of p-chlorobenzoyl peroxide as an initiator and dithiobis-(benzothiazole) as a chain transfer agent, at a temperature of between 75° and 125° C. until a mass is formed having a viscosity of between about 10,000 and 100,000 centipoises at 65° C., carrying out a suspension polymerization step by adding to the mass-copolymer an aqueous dispersion of a suspending agent and stirring the resulting mixture at a temperature of between 75° and 150° C.

It has been found that the mass obtained after the mass polymerization step has a lower viscosity when dithiobis-(benzothiozole) is used instead of other known molecular weight regulators. This viscosity control permits an easier suspension for the second polymerization step. Furthermore, mercaptans react with acrylonitrile in the presence of basic compounds, which are often present as residual products in the rubber employed in ABS, while dithiobis-(benzothiazole) does not react with acrylonitrile. Additionally, dithiobis-(benzothiazole) has the advantage of not being sensitive to air and oxygen.

DESCRIPTION OF THE PREFERRED EMBODIMENTS

The starting reaction mixture is a mixture of monomers comprising 65 to 90% of a styrenic compound, usually styrene, and 35 to 10% of an unsaturated nitrile, usually acrylonitrile, and an amount of elastomer corresponding to about 7 to 15% by weight based on the weight of the monomers mixture. The elastomer most often used in a polymer of 1,4-diene, typically polybutadiene, polyisoprene or a mixture of there two elastomers. Other rubbery compositions or copolymers of butadiene and vinyl compounds, such as for example, butadiene-styrene copolymers, also may be used. The starting rubber must be soluble in the mixture of styrene and acrylonitrile monomers.

The mixture of monomers and rubber form a homogeneous phase which is subjected to a partial mass-copolymerization step under vigorous stirring. This copolymerization is carried out in the presence of p-chlorobenzoyl peroxide as a free radical generating initiator and dithiobis-(benzothiazole) as a chain transfer agent. The amount of initiator is generally between 0.01 and 2%, preferably between 0.1 and 0.2% by weight, based on the total weight of rubber and monomers. The amount of dithiobis-(benzothiazole) may vary; for example, amounts as low as 0.001% by weight of the total rubber and monomers used and as high as 1% by weight of the rubbers and monomers or even more may be used. It is noted, however, that no substantial improvement in properties occurs when amounts in excess of 5% are used. The amount of dithiobis-(benzothiazole) is generally between 0.05 and 1% and preferably 0.05% to 0.5% by weight of the rubber and monomers employed. The thermal stability of p-chlorobenzoyl peroxide is higher than the thermal stability of benzoyl peroxide or other peroxy initiators. The half-lifes (in hours) are the following:

|  | 50° C. | 70° C. | 100° C. |
|---|---|---|---|
| Benzoyl peroxide | 220 | 13 | 0.36 |
| p-chlorobenzoyl peroxide | 310 | 18 | 0.50 |

Consequently, the polymerization rate is lower in the presence of p-chlorobenzoyl peroxide and the control of the polymerizartion temperature is easier. Further, it has been found that the reaction mixture is less viscous when the mass copolymerization is carried out in the presence of p-chlorobenzoyl peroxide. This reaction mixture therefore is more easily stirred, and the thermal exchange and the control of temperature are better than in similar processes using other initiators.

The mass copolymerization is carried out in the absence of air or oxygen which are inhibitors. This copolymerization therefore is performed under an inert atmosphere, preferably under nitrogen.

The reaction mixture is first a continuous phase consisting of elastomer dissolved in the monomers. After a certain degree of conversion of the monomers, a second phase is formed, consisting in styrene-acrylonitrile copolymers dissolved in the monomers. As a result of the evolution of the copolymerization, the volume of said second phase, which is dispersed as small drops in the first phase, increases and finally is more dominant than the volume of the first phase. At this point, a phase inversion occurs. The continuous phase is now the phase consisting in styrene-acrylonitrile copolymers dissolved in the monomers and the discontinuous phase, which is dispersed in the continuous phase, is composed of elastomer dissolved in the monomers.

The mass copolymerization is carried out until 10% to 30% conversion of the monomers. At this point, the viscosity of the reaction mixture is generally between 10,000 and 100,000 centipoises (at 65° C.), this viscosity varying with the elastomer content of the mixture. Such conditions are suitable for continuing the polymerization by suspension polymerization. The product obtained after partial mass-polymerization is mixed with water and an aqueous dispersion of a suspending agent or colloid protector. The suspending agent preferably is selected from the water insoluble inorganic compounds, for example, phosphates, $Al_2O_3$, ZnO, magnesium silicate which is easily and completely eliminated from the ABS resin beads. Preferably, calcium hydroxyapatite is employed. This compound may be prepared from trisodium phosphate and calcium chloride.

It is also advantageous to perform the suspension polymerization step in the presence of a surface-active agent of non-ionic type or anionic type. The amount of a surface-active agent varies with the nature of such agent and with the nature of the suspending agent. When hydroxyapatite is used as a suspending agent and sodium dodecylbenzenesulphonate is used as the surface-active agent, the amount of surface-active agent is between about 0.1 and 0.4 per liter of water in the aqueous phase of the reaction mixture. When the amount of surface-active agent is outside the above values, the beads of ABS resin have a larger than desired diameter which is detrimental to the future working of the resin. Further, in some instances, it is impossible to obtain a suspension of the organic mass in water under such circumstances.

In order to have a particularly efficient suspending agent, the reaction mass resulting from the particle mass polymerization is mixed with water, and the aqueous dispersion of suspending agent is added and then the surface-active agent, for instance the sodium dodecylbenzenesulphonate. In this way, the suspending agent is not in the presence of a high concentration of surface-active agent and consequently, it does not absorb too large an amount of surface-active agent and therefore, does not become too lipophilic which avoids its absorption in the organic mass.

The suspension polymerization step is carried out at a temperature of between 75° and 150° C. According to a preferred embodiment of the present invention, the suspension polymerization step is first carried out at a temperature of between 75° and 125° C. and the temperature is then increased about 15° to 25° C. when the beads of ABS resin have acquired a specific weight higher than that of the aqueous phase. The polymerization is carried out at such increased temperature for a period of about 2 to 4 hours.

The process of the present invention may be carried out in the type of equipment which is currently used for polymerizing styrene or for producing ABS resin. Both steps of the process can be successfully performed in the same reactor. However, if desired, two reactors may be employed, one for the mass copolymerization and the other for the suspension polymerization.

The following examples are presented in order to illustrate the present invention but not to be limiting thereof.

EXAMPLE I 23.27 kg of styrene, 9.50 kg of acrylonitrile, 4.916 kg of rubber (Stereon 703A of Firestone Tire and Rubber Co.), 0.07 kg of dithiobis-(benzothiazole) as chain transfer agent, 1.133 kg of tricresyl phosphate as plasticizer and 0.475 kg of water were introduced into a reactor. The mixture was stirred under a nitrogen atmosphere and then heated up to 94° C. Next, 14.4 g of p-chlorobenzoyl peroxide were added. A mass-polymerization step was carried out under a nitrogen atmosphere with stirring.

In a separate container, a dispersion of suspending agent was prepared by mixing 15.4 kg of water, 0.59 kg trisodium phosphate, 0.79 kg of calcium chloride and 0.0403 kg of calcium oxide. The reaction mixture obtained by the mass-copolymerization and having a viscosity of 96,000 centipoises was admixed with 30.8 kg of water and the above described dispersion of suspending agent. Then, 0.289 kg of an aqueous solution containing 2.5% of the sodium salt of dodecylbenzene-sulphonic acid and 0.0245 kg of cumene peroxide at 40% were added to the mixture. The suspension polymerization step was then carried out at a temperature of 116° C. When the beads of ABS resin began to settle out, 32.7 g dicumyl peroxide was added and the mixture was heated at 135° C. and maintained at such temperature for an additional 3 hours.

The beads produced were separated from the reaction mixture, washed with water, and then dried. The beads granulometry was the following:

| | |
|---|---|
| loweer than 120 mesh | 16.4% |
| 120 mesh | 22.3% |
| 80 mesh | 44.0% |
| 60 mesh | 11.0% |
| 45 mesh | 4.9% |
| 35 mesh | 1.1% |
| 25 mesh | 0.3% |

By way of comparison, the same procedure was repeated but with the use of benzoyl peroxide as initiator in the first step instead of the p-chlorobenzoyl peroxide.

The beads granulometry was the following:

| | |
|---|---|
| lower than 120 mesh | 6.1% |
| 120 mesh | 8.2% |
| 80 mesh | 11.9% |
| 60 mesh | 13.6% |
| 45 mesh | 28.8% |
| 35 | 21.0% |
| 25 mesh | 10.4% |

The properties of the ABS resins obtained with the two initiators were as follows:

| Properties | Initiator in the First Step | |
|---|---|---|
| | p-chlorobenzoyl peroxide | Benzoyl peroxide |
| Impact strength, Izod, of injection plate (notched) (ASTM D 256) | 26.2 kg cm/cm | 31.1 kg cm/cm |
| Softening or VICAT temperature (ASTM D) 1525) | 97.8° C. | 94.1° C. |
| Tensile strength (ASTM D 638) | 435.9 kg/cm2 | 397.4 kg/cm2 |
| Ultimate tensile strength (ASTM D 638) | 362.7 kg/cm2 | 354.7 kg/cm2 |
| Tensile modulus (ASTM D 638) | 21600 kg/cm2 | 20886 kg/cm2 |
| Bending strength (ASTM D 790) | 790.7 kg/cm2 | 780.0 kg/cm2 |
| Bending modulus | 26864 kg/cm2 | 25738 kg/cm2 |
| Gloss | 86% | 79% |
| Gel content | 0.39% | 2.58% |

These comparative tests show that the ABS resins prepared according to the process of the present invention have a higher gloss, a lower gel content, better tensile and bending properties and a better granulometry.

What is claimed is:

1. A process for producing ABS resins by copolymerizing a mixture of a styrene compound and an unsaturated nitrile selected from the group consisting of acrylonitrile and methacrylonitrile, in the presence of an elastomer, by a two-step process comprising a mass copolymerization step and then a suspension copolymerization step, said process comprising carrying out the mass copolymerization step in the presence of p-chlorobenzoyl peroxide as an initiator and dithiobis-(benzothiazole) as a chain transfer agent.

2. The process of claim 1 wherein the p-chlorobenzoyl peroxide is used in an amount of between 0.01 and 2% by weight of the total monomers and elastomer.

3. The process of claim 2 wherein the amount of p-chlorobenzoyl peroxide is between 0.01 and 0.02% by weight of the total monomers and elastomer.

4. The process of claim 1 wherein the dithiobis-(benzothiazole) is used in an amount of between 0.001 and 5% by weight of the total monomers and elastomer.

5. The process of claim 4 wherein the dithiobis-(benzothiazole) is used in an amount of between 0.05 and 1% by weight of the total monomers and elastomer.

6. The process of claim 1 wherein the elastomer is one selected from the group consisting of polybutadienes, polyisoprenes and mixtures thereof.

7. The process of claim 1 wherein the suspending agent employed in said suspension polymerization step is a water insoluble inorganic compound.

8. The process of claim 7 wherein said suspending agent is calcium hydroxyapatite.

9. The process of claim 1 wherein said suspension polymerization step includes the use of a surfactant of the non-ionic or anionic type.

10. The process of claim 1 wherein said two-step process comprises carrying out the mass copolymerization step of a styrenic compound and an unsaturated nitrile selected from the group consisting of acrylonitrile and methacrylonitrile, in the absence of air or oxygen and in the presence of an elastomer and in the presence of p-chlorobenzoyl peroxide as an initiator and dithiobis-(benzothiazole) as a chain transfer agent, at a temperature of between 75 and 120° C. up to formation of a mass copolymer having viscosity of about 10,000 to 100,000 centipoises at 65° C., carrying out the suspension copolymerization step by adding to the mass copolymer, an aqueous dispersion of a suspending agent, followed by a surface active agent and subjecting, while stirring, the mixture to a temperature of between 75 and 150° C.

* * * * *

UNITED STATES PATENT OFFICE
CERTIFICATE OF CORRECTION

Patent No. 4,141,933      Dated February 27, 1979

Inventor(s) William J. I. BRACKE

It is certified that error appears in the above-identified patent and that said Letters Patent are hereby corrected as shown below:

In the Bibliographical portion of the instant patent kindly correct the spelling of the Assignee's company name to read --LABOFINA--.

Signed and Sealed this

Twenty-fifth Day of September 1979

[SEAL]

Attest:

Attesting Officer      LUTRELLE F. PARKER
Acting Commissioner of Patents and Trademarks